(12) United States Patent
Cavazos Sepulveda et al.

(10) Patent No.: US 12,467,342 B2
(45) Date of Patent: Nov. 11, 2025

(54) ABLATING MATERIALS IN A WELLBORE (71) Applicant: Saudi Arabian Oil Company, Dhahran (SA)

(72) Inventors: Adrian Cesar Cavazos Sepulveda, Nuevo Leon (MX); Sameeh Batarseh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/432,612

(22) Filed: Feb. 5, 2024

(65) Prior Publication Data

US 2025/0250886 A1  Aug. 7, 2025

(51) Int. Cl.
*E21B 43/11* (2006.01)
*E21B 33/127* (2006.01)
*E21B 47/04* (2012.01)
*E21B 47/07* (2012.01)

(52) U.S. Cl.
CPC ............ *E21B 43/11* (2013.01); *E21B 33/127* (2013.01); *E21B 47/04* (2013.01); *E21B 47/07* (2020.05)

(58) Field of Classification Search
CPC ........ E21B 43/11; E21B 47/07; E21B 33/127; E21B 47/04
See application file for complete search history.

(56) References Cited

U.S. PATENT DOCUMENTS

| | | | |
|---|---|---|---|
| 10,053,967 B2 | 8/2018 | Deutch et al. | |
| 10,822,879 B2 | 11/2020 | Batarseh | |
| 10,968,736 B2 | 4/2021 | Batarseh | |
| 11,248,426 B2 | 2/2022 | Batarseh et al. | |

(Continued)

FOREIGN PATENT DOCUMENTS

| | | |
|---|---|---|
| WO | WO 0149972 A1 | 7/2001 |
| WO | WO 2004009958 A1 | 1/2004 |

(Continued)

OTHER PUBLICATIONS bakerhughes.com [online], "RCX Magna," Dec. 2, 2021, via Internet Archive: Wayback Machine URL <https://web.archive.org/web/20211202190215/https://www.bakerhughes.com/evaluation/wireline-openhole-logging/fluid-characterization-and-testing/rcx-magna>, retrieved on Jul. 1, 2024, retrieved from URL <https://www.bakerhughes.com/evaluation/wireline-openhole-logging/fluid-characterization-and-testing/rcx-magna>, 6 pages.

(Continued)

*Primary Examiner* — Dany E Akakpo
(74) *Attorney, Agent, or Firm* — Fish & Richardson P.C.

(57) ABSTRACT

Systems and methods include a laser tool for ablating solid materials in a wellbore. The laser tool includes a housing having a first end and a second end opposite the first end; a laser head attached to a side of the housing between the first end and the second end. The laser head is optically coupled to a laser source and includes optical elements configured to focus a laser beam to ablate the solid materials. The laser tool includes a packer adjacent to the first end of the housing configured to form a seal between the housing and interior surfaces of the wellbore; and a fluid having a lower optical absorption at a wavelength of the laser source than an optical absorption of fluids in the wellbore, the fluid configured to surround the laser head, contact the packer, and permit the laser beam to propagate to ablate the solid materials.

20 Claims, 7 Drawing Sheets

(56) References Cited

U.S. PATENT DOCUMENTS

| | | |
|---|---|---|
| 11,761,265 B2 | 9/2023 | Faircloth et al. |
| 2006/0102343 A1* | 5/2006 | Skinner ............... B23K 26/082 |
| | | 166/57 |
| 2008/0166132 A1* | 7/2008 | Lynde .................... E21B 29/06 |
| | | 398/142 |
| 2012/0074110 A1 | 3/2012 | Zediker et al. |
| 2012/0118568 A1 | 5/2012 | Kleefisch et al. |
| 2015/0165497 A1 | 6/2015 | Bozso et al. |
| 2015/0361750 A1 | 12/2015 | Zediker et al. |
| 2020/0173236 A1* | 6/2020 | Ramos ................... E21B 7/065 |
| 2021/0381316 A1 | 12/2021 | Batarseh |
| 2022/0213886 A1* | 7/2022 | Al-Gouhi ................ F04B 47/06 |

FOREIGN PATENT DOCUMENTS

| | | |
|---|---|---|
| WO | WO 2008085675 A1 | 7/2008 |
| WO | WO 2020250021 A1 | 12/2020 |

OTHER PUBLICATIONS

International Search Report and Written Opinion in International Appln. No. PCT/US2025/013976, mailed on Apr. 29, 2025, 14 pages.

\* cited by examiner

ABLATING MATERIALS IN A WELLBORE

TECHNICAL FIELD

The present disclosure relates to methods and systems for ablating materials in wellbores, for example, using a laser tool.

BACKGROUND

Laser ablation is a process useful for removing material from a solid or liquid surface by focusing laser energy onto the surface. The laser energy heats the surface and evaporates or sublimates the liquid or solid. The amount of material removed from the surface due to evaporation or sublimation depends on the amount of energy absorbed by the surface. Many factors affect the amount of energy that can be absorbed by the surface including, material properties, properties of any intervening media that the laser traverses, initial power of the laser, and so forth.

In the oil and gas industry, laser ablation can be used to stimulate hydrocarbon bearing subsurface formations to enhance oil and gas recovery from the subsurface formation. For example, a laser ablation tool can be used to perforate walls of a wellbore creating fluid flow pathways in the subsurface formation.

SUMMARY

This disclosure describes systems and methods for ablating solid materials in a wellbore. A laser tool for ablating solid materials includes a housing having a first end (e.g., uphole end) and a second end (e.g., downhole end) opposite the first end. A laser head is integrated with a side of the housing between the first end and the second end. The laser head includes one or more optical elements (e.g., optical lenses) to focus a laser beam. The laser head is optically coupled to a laser source. The laser tool also includes a packer adjacent to the first end of the housing, the packer can form a seal between the housing and interior surfaces of the wellbore. The laser tool is fluidly coupled to a supply of fluid having a lower optical absorption at a wavelength of the laser source than an optical absorption of fluids in the wellbore.

The packer can be extended (e.g., inflated or mechanically actuated) to form a seal between the laser tool and surfaces of the wellbore. The supply of fluid having a lower optical absorption can be used to form a volume of the fluid that encloses the laser head. The packer helps control the location of the volume of fluid. For example, the packer prevents the volume of fluid from rising away from the laser head due to buoyancy forces. The laser tool emits a laser beam that propagates from the laser head through the volume of fluid to a surface of the wellbore to ablate material on the surface of the wellbore.

Implementations of the systems and methods of this disclosure can provide various technical benefits. For example, creating an enclosure around the laser head of the laser tool with a fluid that has a lower optical absorption than the fluids in the wellbore enables the laser beam to propagate a greater distance in the wellbore. The laser beam arrives at the ablation surface with more power when propagating through the fluid with the lower optical absorption because less power was absorbed by the intervening fluid. The increased propagation distance and increased power result in improved operating efficiency of the laser tool as compared with a laser tool operating in a fluid with a higher optical absorption. The fluid with the lower optical absorption also reduces heat generated by the laser by allowing the laser beam to pass through the fluid with reduced absorption compared to the wellbore fluids. When the fluid with lower optical absorption is a gas, less heat can be transferred between the subsurface formation and the laser head as compared with an intervening liquid.

The details of one or more implementations of these systems and methods are set forth in the accompanying drawings and the description below. Other features, objects, and advantages of these systems and methods will be apparent from the description and drawings, and from the claims.

BRIEF DESCRIPTION OF THE DRAWINGS

Like reference symbols in the various drawings indicate like elements.

DETAILED DESCRIPTION

This disclosure describes systems and methods for ablating solid materials in a wellbore. A high-power laser can be used to ablate materials in a wellbore of a subsurface formation. For example, laser ablation can be used to perforate a surface of the wellbore or piping in the wellbore. Example materials to be ablated include scales (e.g., pyrite and sulfates), rocks (e.g., carbonates, sandstones, limestones), cement, and casing material. The high-power laser can be immersed in wellbore fluids (e.g., aqueous solutions, brines) with high optical absorption of the desired laser wavelength(s). The systems and methods of this disclosure create an enclosure using a fluid (e.g., gaseous mixtures, nitrogen, halocarbons, perchloroethylene) with lower optical absorption of the desired laser wavelength(s) than the wellbore fluids. The fluid with lower optical absorption can also have a different density than the wellbore fluid and a low miscibility in the wellbore fluid. The enclosure can extend the laser propagation distance (e.g., ablation or perforation distance).

Figure 1:
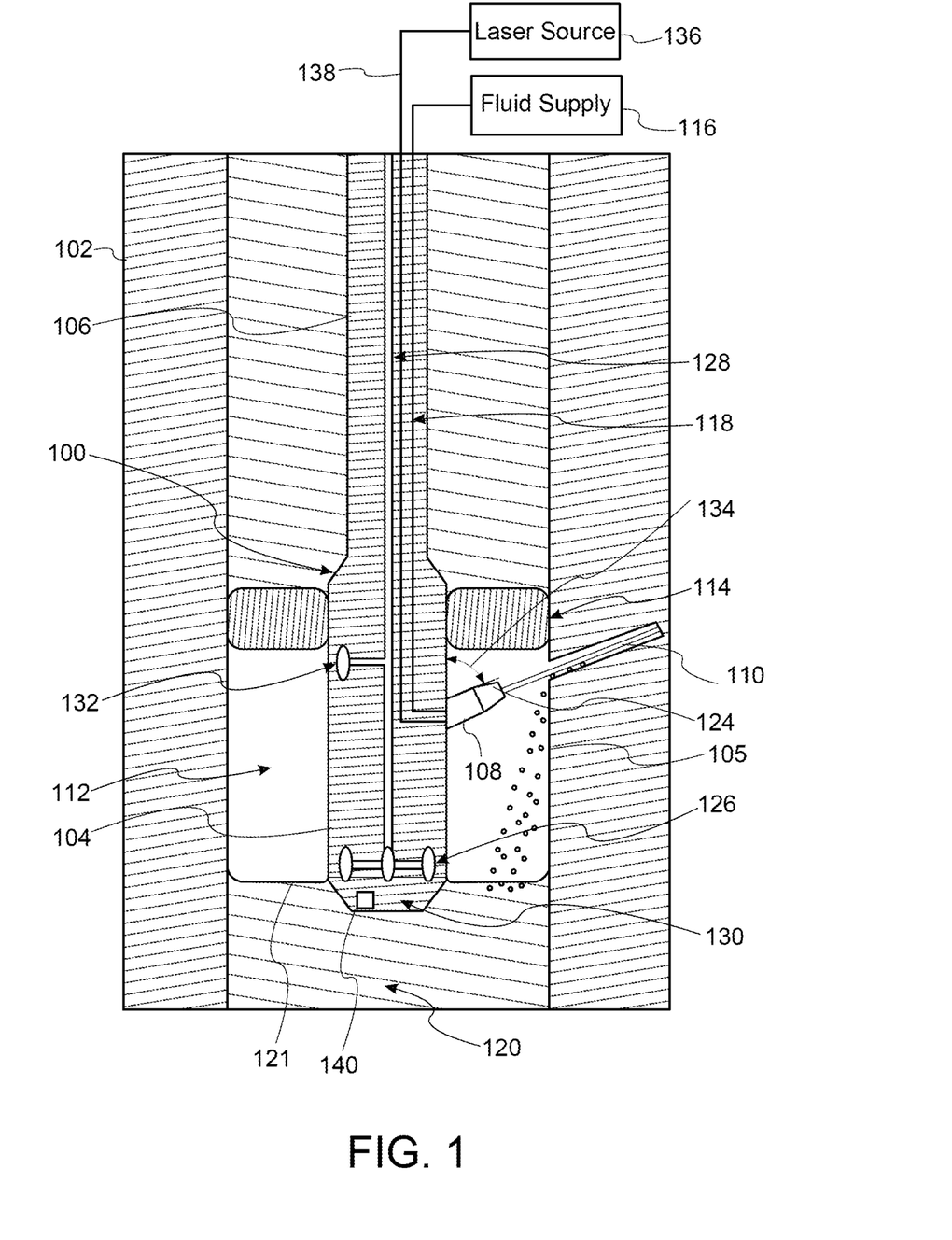
FIG. 1 is an illustration of an example laser tool for ablating material in a wellbore of a subsurface formation.

FIG. 1 is a schematic illustration of an example laser tool 100 for ablating solid materials in a wellbore 102. The laser tool 100 includes a housing 104. The housing 104 is connected to a pipe string 106 that suspends the laser tool 100 in the wellbore 102. A laser head 108 is attached to the housing 104. For example, laser head 108 can be attached to the housing 104 by removable fasteners such as bolts, screws, studs, and/or nuts. The laser head 108 emits a laser beam 110 to ablate solid material on the walls 105 of the wellbore 102. At a first end 112 of the housing 104 uphole from the laser head 108, a packer 114 is coupled to the housing 104. The packer 114 as shown is expanded or inflated to form a seal between the housing 104 and the walls 105 of the wellbore 102. The packer 114 can be expanded or inflated by hydraulic forces (e.g., pressurized gas) or mechanical devices.

The laser tool 100 is fluidly coupled to a supply of fluid 116 through a fluid supply line 118. The supply of fluid 116 includes a fluid having a lower optical absorption at a wavelength of the laser tool 100 than fluids 120 in the wellbore 102. For example, the supply of fluid 116 includes a gaseous mixture including nitrogen as a main component. The fluids 120 in the wellbore 102 include, for example, aqueous solutions and/or brines. The fluid supply line 118 is coupled to a fluid outlet 124 (e.g., purge nozzles) on the laser head 108. In some implementations, the fluid supply line 118 is coupled to one or more outlets on the housing 104.

During use, the fluid from the supply of fluid 116 can flow through the fluid supply line 118 and out of the fluid outlet 124 to form a volume of fluid 122 that surrounds the laser head 108. The volume of fluid 122 can have a lower density than the fluids 120 of the wellbore 102. Through buoyancy, the volume of fluid 122 displaces the fluids 120 of the wellbore 102 lowering the fluid level 121 with respect to the laser head 110. The differential pressure caused by the volume of fluid 122 can be related to the height of the volume of fluid, h, and the difference in the density of the volume of fluid 122 and the fluids 120 of the wellbore 102. For example, the differential pressure can be given by $\Delta\rho=\rho_2 gh-\rho_1 gh$, where $\rho_2$ is the density of the fluids 120 of the wellbore, $\rho_1$ is the density of the volume of fluid 120, and g is the gravity constant. Additionally, the volume of fluid 122 can have low miscibility relative to the fluids 120 of the wellbore (e.g., the volume of fluid 122 may not mix well and/or dissolve in the fluids 120 of the wellbore). The volume of fluid 122 also has a lower optical absorption at the wavelength of the laser beam 110 than the fluids 120 of the wellbore 102. The volume of fluid 122 creates a transmission path for the laser beam 110 with lower optical absorption resulting in the laser beam 110 arriving at the walls 105 of the wellbore 102 with more energy as compared with the laser beam 110 propagating through the fluids 120 of the wellbore 102. In some implementations, such as directional or horizontal wellbores, a continuous flow of fluid maintains the volume of fluid 122 to displace the fluids 120. In some implementations, two or more packers are used to form separate sections of the wellbore to form the volume of fluid 122.

The housing 104 includes exhaust ports 126 that enable fluid from the volume of fluid 122 to exhaust to the surface through fluid exhaust line 128. The exhaust ports 126 are located adjacent to a second end 130 (e.g., downhole end) of the housing 104. The exhaust ports 126 include valves to control when fluid is exhausted. The location of the exhaust ports 126 can control the height of the volume of fluid 122. For example, the fluid from the supply of fluid 116 can fill the space between the packer 114 and the exhaust ports 126. In some implementations, the housing 104 also includes an additional exhaust port 132 near the packer 114. The additional exhaust port 132 can include an actuated valve to selectively open the additional exhaust port 132 to exhaust fluid from the volume of fluid 122. Additional exhaust port 132 can be operated independently from exhaust ports 126. For example, the additional exhaust port 132 can be opened to raise the level of the fluids 120 in the wellbore 102 to clean or flush the ablated area.

The laser head 108 is optically coupled to a laser source 136. The laser source 136 can be, for example, on the surface. The laser light generated by the laser source 136 is transmitted to the laser head 108 through an optical fiber 138. The laser source 136 produces, for example, a laser beam 110 with a wavelength of 1062 nanometers (nm). Light at 1062 nm is heavily absorbed by waters and brines (e.g., fluids in the wellbore). A gas (e.g., nitrogen) has a much lower optical absorption of 1062 nm light. The laser source 136 can be, for example, a liquid laser (e.g., dye laser), a gas laser (e.g., He—Ne, $CO_2$), or a solid state laser (e.g., Nd:YAG, diode laser). The laser wavelength can be for example, between 200 nm and 20000 nm. In some implementations, the laser wavelength is adjustable by, for example, harmonic crystals or dye mixtures.

The laser head 108 is rotatable with respect to the housing 104. For example, the angle 134 of the laser head 108 with respect to the housing 104 is adjustable by rotating the laser head 108 about a rotatable joint. The laser head 108 can be rotated relative to the housing 104 from a remote location. For example, the laser head 108 can be controlled from the surface. Adjusting the angle 134 of the laser head 108 enables various locations along the walls 105 of the wellbore 102 to be targeted for ablation. Adjusting the angle 134 enables more locations along the walls 105 of the wellbore 102 to be targeted for ablation as compared to a laser tool without an adjustable laser head relative to the housing. The laser tool 100 can also be rotated about a longitudinal axis of the laser tool 100. For example, the laser tool 100 can rotate in a 3600 circle to rotate the laser beam to ablate material from the walls 105 of the wellbore irrespective of azimuthal angle.

In some implementations, a fluid level sensor 140 is coupled to the housing 104 near the second end 130 to determine a level of the fluids 120 of the wellbore 102. The fluid level sensor 140 can transmit signals indicating the water level to a data processing system (e.g., a controller or computer system) to be processed. In response to determining that the fluid level is too low (e.g., below a threshold level), the exhaust ports 126 or 132 can be opened to exhaust fluid from the volume of fluid 120. Alternatively, or additionally, in response to determining that the fluid level is too high, fluid from the supply of fluid 116 can be added to the volume of fluid through fluid outlet 124.

Figure 2:
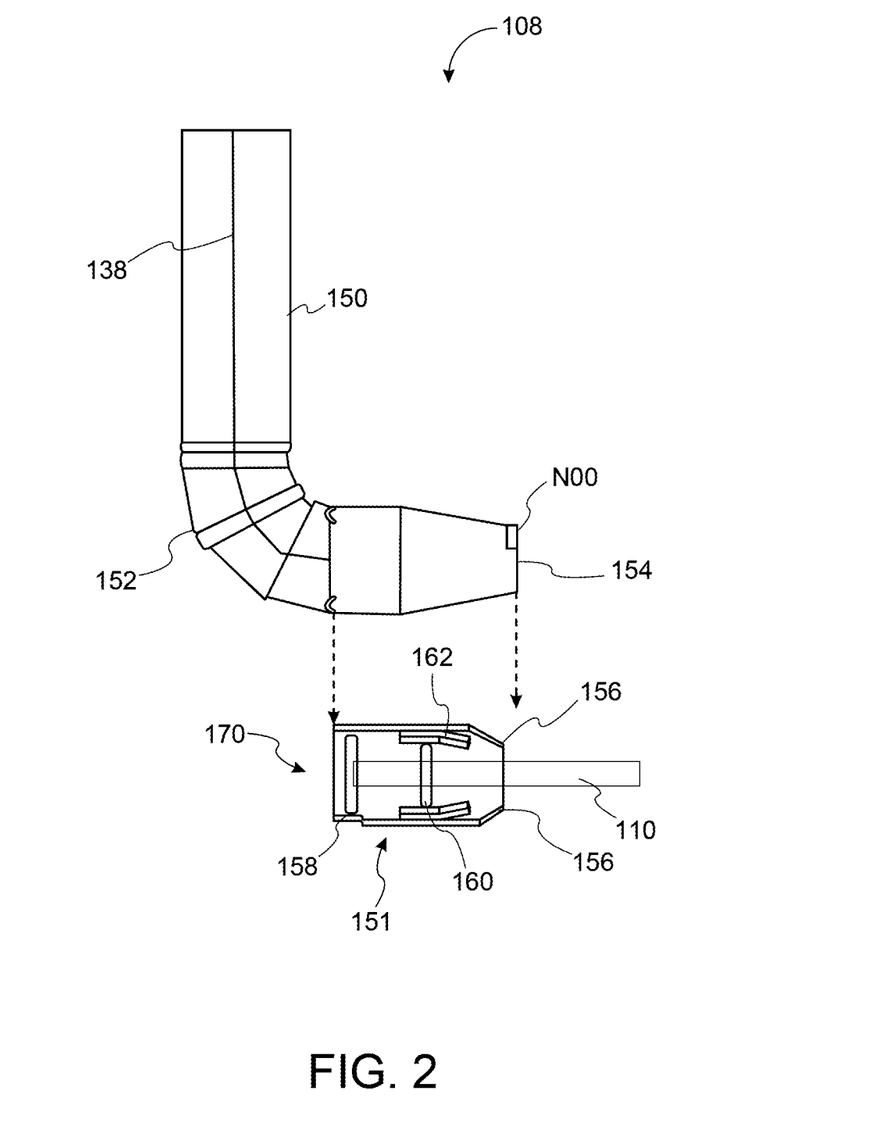
FIG. 2 is a schematic of an example laser head for a laser tool for ablating material in a wellbore.

FIG. 2 is a schematic illustration of an example laser head 108 for ablating materials in a wellbore. The laser head 108 includes a body 150 to house optical elements 151 and fluid pathways. The body 150 includes a rotational joint 152 that enables the laser head 108 to rotate relative to the housing 104 of the laser tool 100. The beam outlet 154 of the laser head 108 includes purging nozzles 156. The purging nozzles 156 can be the fluid outlet 124 to fill the volume of fluid 120 from the supply of fluid 116. The purging nozzles 156 also flush the optical elements of debris from the surface being ablated and clear a path through debris for the laser beam 110.

A cross-section view of a portion of the body 150 is shown in the inset 170. Inside the body 150, is a fiber optic 138 that optically couples the laser head 108 to the laser source 136. The body 150 also includes optical elements 151 including a lens 158 (e.g., a focusing lens) and a cover lens 160. The lens 158 is positioned between the laser source (e.g., outlet of the optical fiber) and the cover lens 160. The cover lens 160 is positioned between the lens 158 and the beam outlet 154. The lens 158 shapes the laser beam 110. For example, the lens 158 can focus the laser beam 110 at a particular distance from the beam outlet 154 of the laser head 108. The cover lens 160 protects the fiber optic 138 and the lens 158 from debris and/or fluid from the wellbore. In some implementations, the laser head 108 includes more than one lens to focus or reshape the laser beam 110. Examples of reshaping the laser beam 110 include expanding and contracting the laser beam 110 using, for example, convex and concave lenses.

A fluid knife 162 (e.g., a gas knife or an air knife) protects the cover lens 160 and cools the optical elements (e.g., cover lens 160 and lens 158). For example, the fluid knife 162 is a sheet of flowing air forming a barrier between the cover lens 160 and the ambient environment.

A temperature sensor 164 is coupled to the tip 154 of the laser head 108. The temperature sensor 164 measures the temperature of the laser head 108. The temperature sensor 164 can send signals indicative of the temperature to a data processing system to be processed. The data processing system can monitor the temperature for abnormalities in the operation of the laser head 108. For example, the temperature sensor can indicate that the laser head is heating beyond a specified threshold temperature. A rise in temperature can indicate that the laser beam 110 is being reflected from the ablation target back on to the laser head 108.

Figure 3:
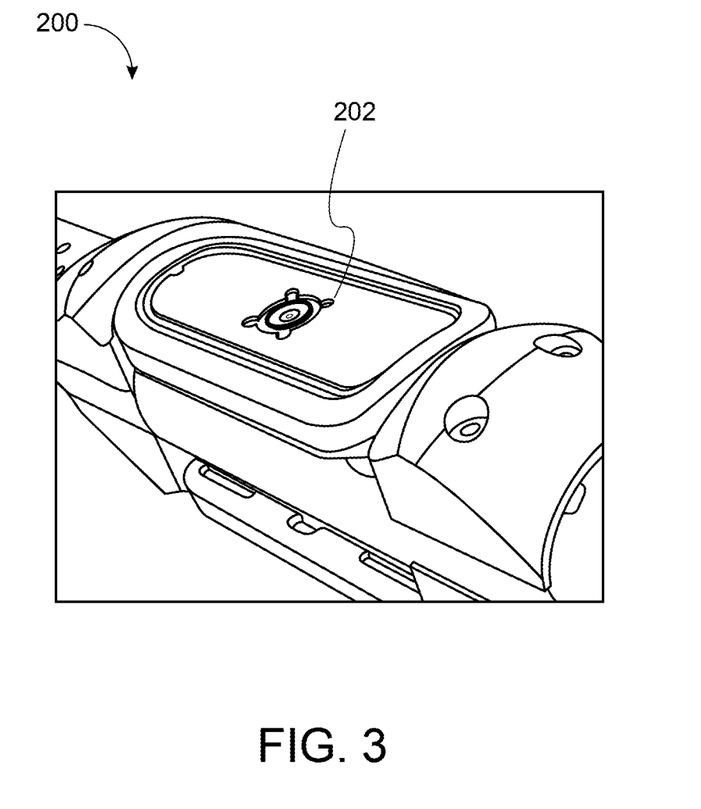
FIG. 3 is a schematic of an example mechanical packer.

FIG. 3 is an illustration of an example mechanically activated packer 200 that can be used with the laser tool 100. Mechanical packers can handle additional pressures above reservoir pressure, which can be beneficial for use in perforating the walls of the wellbore. When activated, packing material 202 is actuated away from the central axis of the mechanically activated packer 200 to contact the walls of the wellbore. Alternatively, the mechanically activated packer 200 contacts interior walls of piping or casing.

Figure 4:
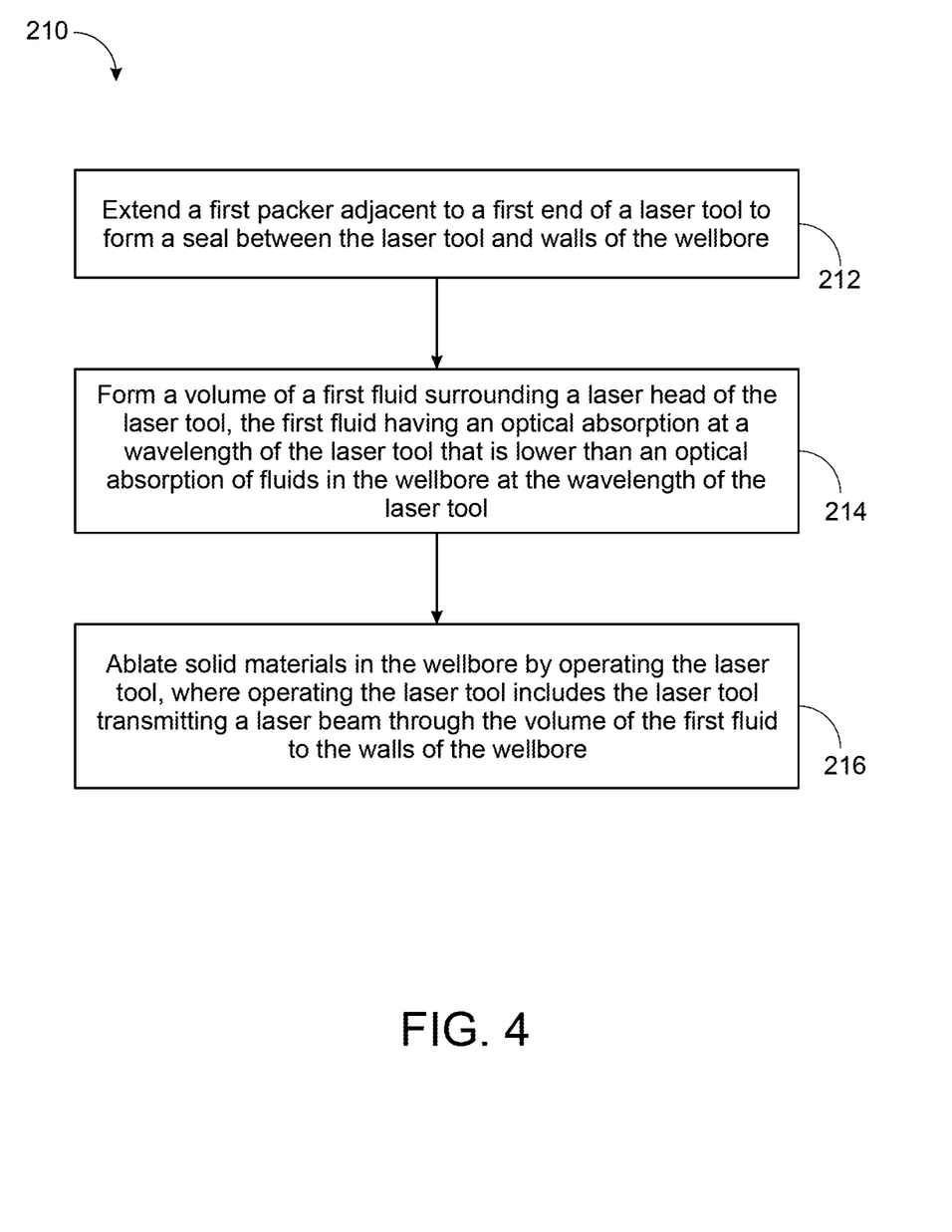
FIG. 4 is a flow chart of an example method for ablating material in a wellbore.

FIG. 4 is a flow chart of an example method 210 for ablating solid materials in a wellbore. At step 212, a first packer adjacent to a first end of a laser tool is extended to form a seal between the laser tool and walls of the wellbore. Extending the packer can include actuating a mechanical packer or inflating inflatable packing material. In some implementations, the packer is extended to form a seal between the laser tool and walls of piping or casing.

At step 214, a volume of a first fluid is formed surrounding a laser head of the laser tool. The first fluid has an optical absorption at a wavelength of the laser tool that is lower than an optical absorption of fluids in the wellbore at the wavelength of the laser tool. The volume of the first fluid can be formed by injecting the first fluid from a supply of the first fluid into the wellbore through a fluid outlet of the laser tool. The first fluid can have a lower density than the wellbore fluid and thereby form the volume between the packer and the fluids of the wellbore due to buoyancy effects.

At step 216, solid materials in the wellbore are ablated by operating the laser tool. Operating the laser tool includes transmitting a laser beam from the laser tool through the volume of the first fluid to the walls of the wellbore. The laser tool can be operated with a continuous laser beam (e.g., the laser beam is emitted without interruption). Alternatively, the laser tool can be operated with a pulsed laser beam (e.g., the laser beam is active for a specified time period and inactive for a specified time period). Operating the laser tool can include rotating the laser head relative to the laser tool to target a location of the wellbore to ablate.

In some implementations, the method 210 includes operating an exhaust valve coupled to an exhaust port of the laser tool to remove a portion of the first fluid from the volume of the first fluid. For example, an exhaust port located adjacent to a downhole end of the laser tool can be operated to control a height of the volume of the first fluid. An exhaust port located adjacent to an uphole end of the laser tool can be operated to exhaust the first fluid from the volume of the first fluid to, for example, clean or flush the area of the wellbore being ablated.

In some implementations, debris intervening between the laser head and the walls of the wellbore is removed from the path of the laser beam by flowing the first fluid through purging nozzles of the laser head. The first fluid can flow through the purging nozzles continuously while operating the laser tool to maintain a clear path for the laser beam.

A temperature of the laser head can be measured using a temperature sensor coupled to the laser head. Measuring the temperature of the laser head can indicate abnormal operating conditions such as the laser head exceeding a threshold operating temperature and/or the laser beam reflecting from the ablation surface back to the laser head. Corrective actions, for example, turning off the laser tool, can be performed in response to measuring a temperature outside of an operating temperature range.

A level of the fluids in the wellbore can be measured using a fluid level sensor coupled to a downhole end of the laser tool. In response to measuring the level of the fluid in the wellbore, exhaust valves of the laser tool can be operated to control a size of the volume of the first fluid. For example, in response to determining that the fluid level is higher than a threshold level, the exhaust valves can be closed to enable the volume of the first fluid to be expanded by injecting more of the first fluid into the wellbore. Additionally, or alternatively, in response to determining that the fluid level is lower than a threshold level, the exhaust valves can be opened to remove or exhaust a portion of the first fluid through the exhaust line to decrease the volume of the first fluid.

In some implementations, a second packer adjacent to a second end (e.g., downhole end) of the laser tool opposite the first end is extended. The volume of the first fluid includes the volume between the first packer and the second packer. The second packer can include inflatable packing material or a mechanically actuated packer.

Figure 5:
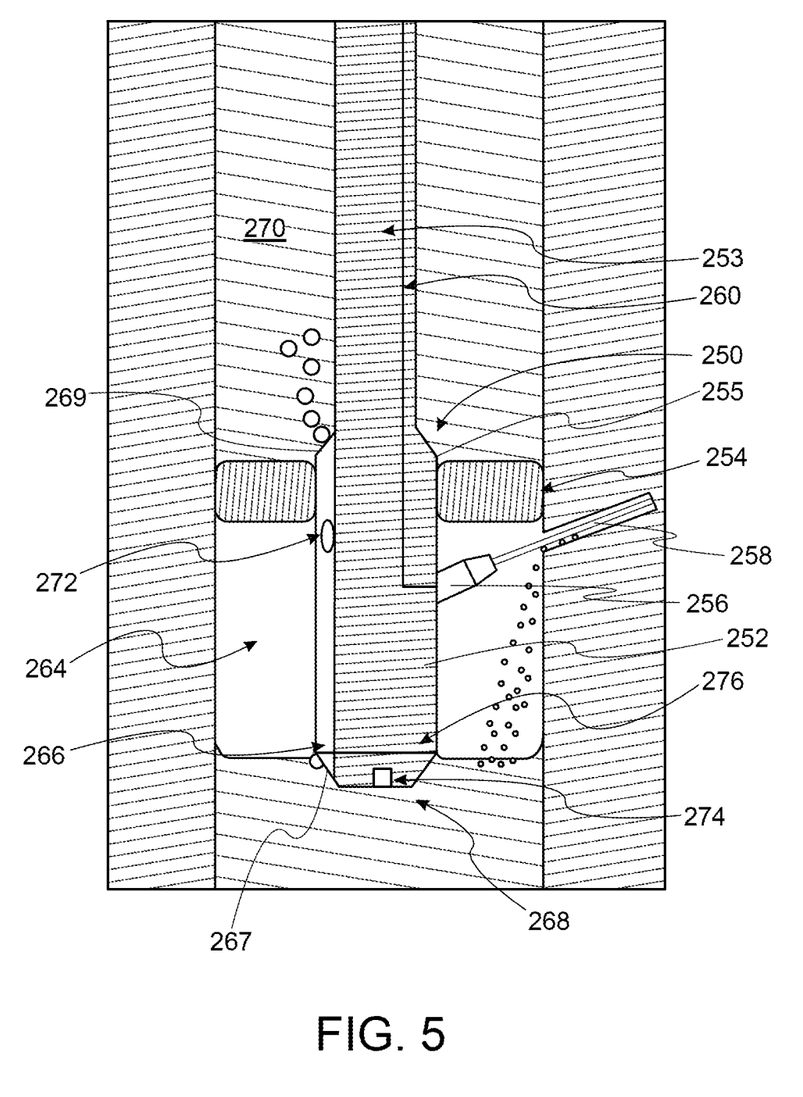
FIG. 5 is an illustration of another example laser tool for ablating material in a wellbore.

FIG. 5 is an illustration of another example laser tool 250. The features illustrated in laser tool 250 can be used in any combination with features described and illustrated with reference to laser tool 100. The laser tool 250 includes a housing 252 coupled to a pipe string 253. Packer 254 is coupled to the housing 252 adjacent to a first end 255 of the housing 252. The packer 254 is expandable by being inflated by a fluid or mechanically actuated. The laser tool 250 includes a laser head 256 to transmit a laser beam 258 to a surface to be ablated. A fluid supply line 260 is fluidly coupled to fluid outlets 262 of the laser head 256. After expansion of the packer 254, fluid from the fluid supply line 260 can be injected into the wellbore to form a volume 264 of fluid surrounding the laser head 256.

A fluid channel 266 is coupled to the housing 252. The fluid channel 266 is open on the downhole end 267 and the uphole end 269 enabling fluid communication between the wellbore fluid 268 downhole from the laser tool 250 with the wellbore fluid 270 uphole from the laser tool 250. A valve 272 located on a portion of the fluid channel 266 near the first end 255 of the housing can be actuated to an open position or a closed position. In the open position, the valve 272 allows fluid from the volume 264 to exhaust through the fluid channel 266 due to the effects of buoyancy. The length of the fluid channel 266 (e.g., the distance between the downhole end 267 and the uphole end 269) determines a maximum height of the volume 264. In some implementations, the fluid channel 266 is a pipe or tube. The laser tool 250 can also include a fluid level sensor 274 coupled to a second end 276 of the housing 252 to measure the fluid level of the wellbore fluid 268.

Figure 6A:
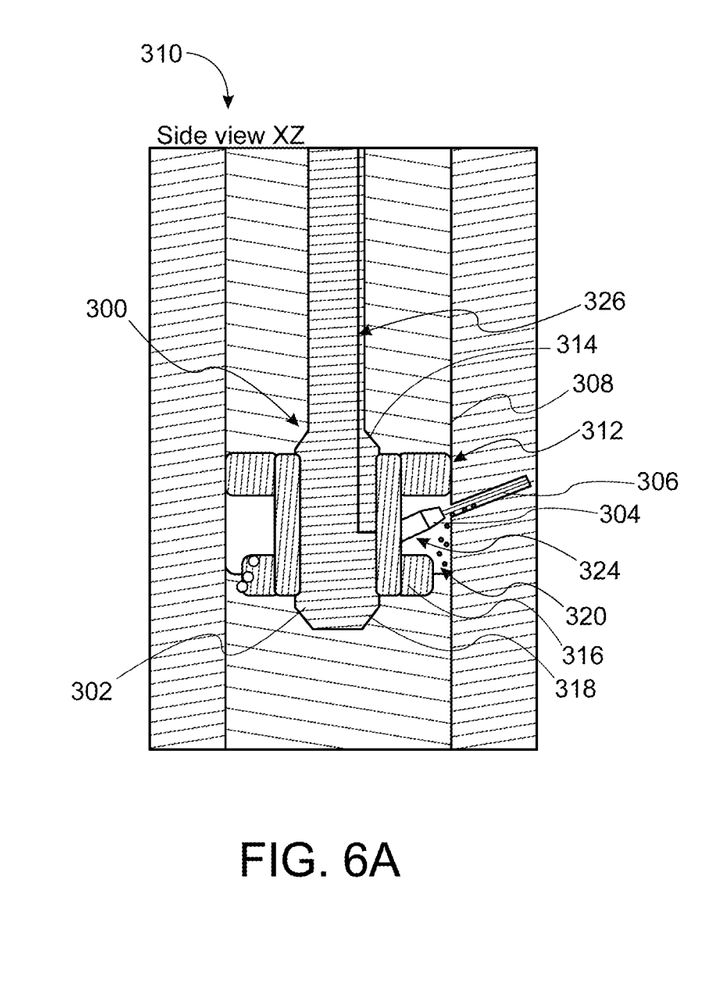
FIG. 6A is an illustration of another example laser tool for ablating material in a wellbore.

FIG. 6A shows a schematic illustration of another example laser tool 300 for ablating solid material in a wellbore. The laser tool 300 can include features depicted in laser tool 100 and/or laser tool 250. The laser tool 300 includes a housing 302 and a laser head 304 to transmit a laser beam 306 to ablate material on walls 308 of the wellbore 310. A first packer 312 is coupled to the housing 302 adjacent to a first end 314 of the housing 302. The first packer 312 is expandable and can contact the walls 308 of the wellbore. A second packer 316 is coupled to the housing 302 adjacent to a second end 318 of the housing 302 opposite the first end 314. The second packer 316 can leave a gap 320 between the second packer 316 and the wall 308 of the wellbore 310. The gap 320 allows debris 322 from the ablation region to fall to the wellbore fluid. Fluid with a lower optical absorption than wellbore fluid injected through the laser head 304 from fluid supply line 326 can form a volume 324 surrounding the laser head 304. The fluid volume 324 includes the volume between the second packer 316 and the first packer 312.

Figure 6B:
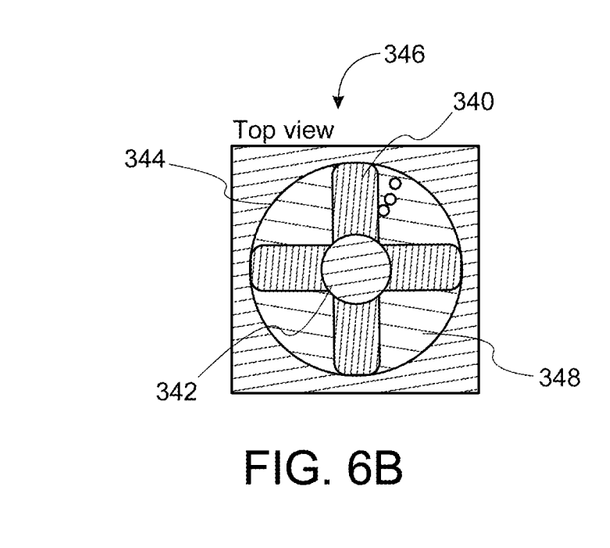
FIGS. 6B-6C illustrate example non-cylindrical packer configurations.

FIG. 6B illustrates an example of non-cylindrical packers 340. The 340 extends from the housing 342 to the wall 344 of the wellbore 346 in discrete locations around the housing 342 (e.g., in a cross formation). This configuration of packer 340 allows control over the location of the housing 342 within the wellbore 346 while allowing wellbore fluid 348 to continue to flow uphole during an ablation operation. A volume of fluid (not shown) with a lower optical absorption than wellbore fluid can form in a bubble beneath the packer 340.

Figure 6C:
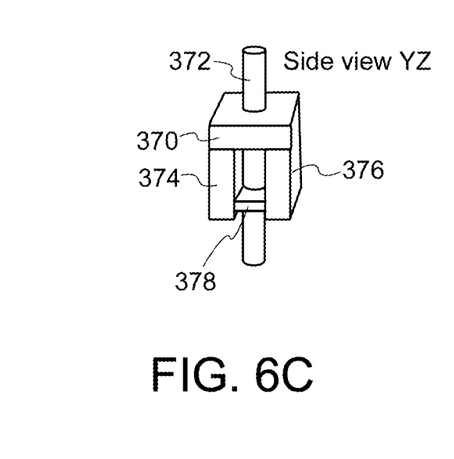

FIG. 6C illustrates another example of a non-cylindrical packer 370. The packer 370 forms a square around the housing 372 of the laser tool. The packer 370 includes sides 374 and 376 and a bottom 378. The packer 370 in this configuration further defines an enclosure for the volume of fluid with a lower optical absorption reducing the amount of fluid needed to displace the wellbore fluid. The geometry of a non-cylindrical packer can be determined based on the details of a particular implementation. For example, a non-cylindrical packer can be used to fit a non-uniform wellbore geometry or tool configuration. A non-cylindrical packer can be used to reduce a cross section of the wellbore through which wellbore fluid can flow.

Figure 7:
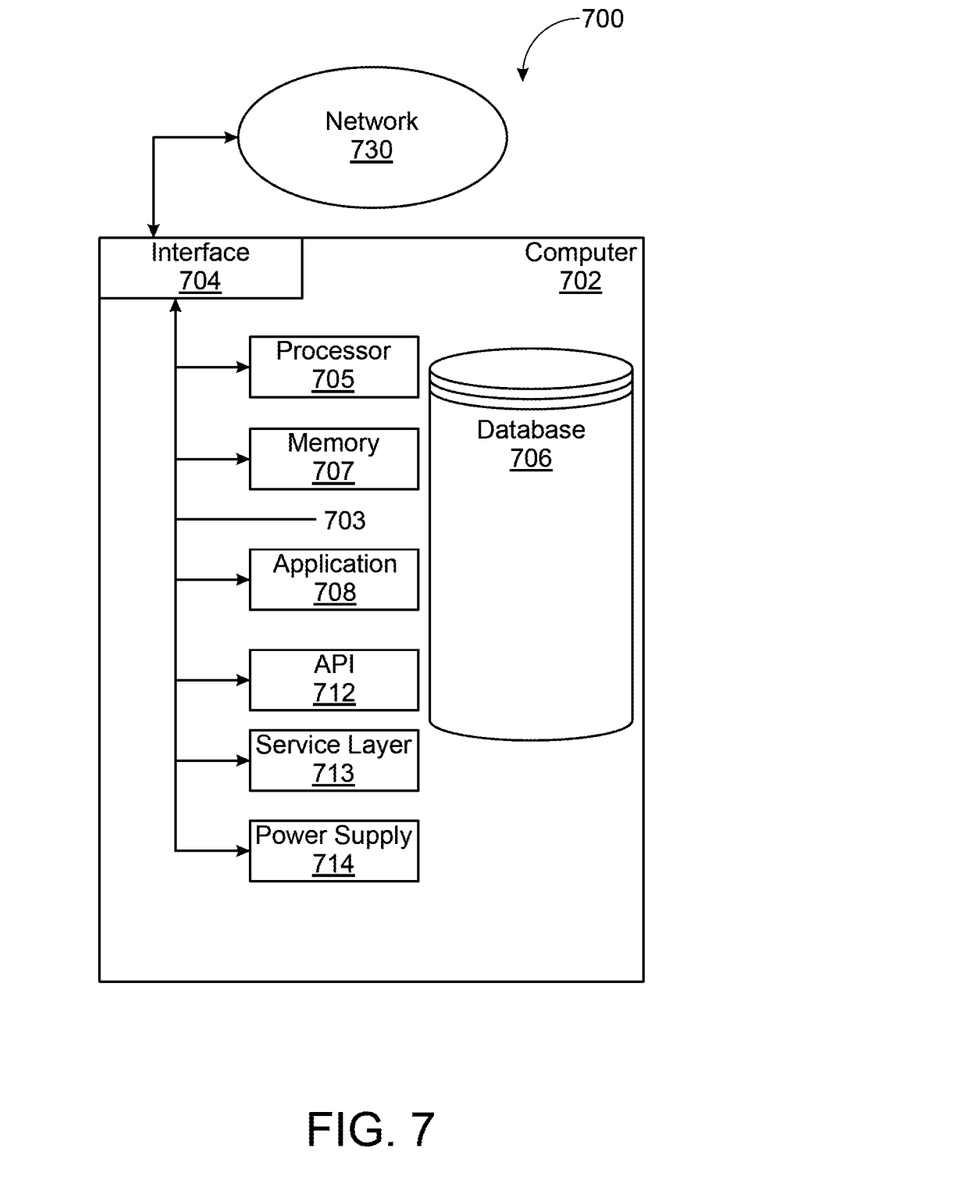
FIG. 7 is a block diagram illustrating an example computer system used to provide computational functionalities associated with described algorithms, methods, functions, processes, flows, and procedures according to some implementations of the present disclosure.

FIG. 7 is a block diagram of an example computer system 700 used to provide computational functionalities associated with described algorithms, methods, functions, processes, flows, and procedures described in the present disclosure, according to some implementations of the present disclosure. For example, the computer system 700 can be used to control the laser tools 100, 250, or 300. Alternatively, or additionally, the computer system 700 can be used to receive signals from various sensors (e.g., temperature sensors, fluid level sensors) and process the received signals. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a high level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both), over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of implementations of these systems and methods have been described. Nevertheless, it will be understood that various modifications may be made without departing from the spirit and scope of this disclosure. For example, features of laser tool 100 can be combined with features of laser tool 250 and/or laser tool 300 and vice versa. Accordingly, other implementations are within the scope of the following claims.

EXAMPLES

In an example implementation, a laser tool for ablating solid materials in a wellbore includes a housing having a first end and a second end opposite the first end; a laser head attached to a side of the housing between the first end and the second end, the laser head including one or more optical elements configured to focus a laser beam to ablate the solid materials, the laser head optically coupled to a laser source; a packer adjacent to the first end of the housing, the packer configured to form a seal between the housing and interior surfaces of the wellbore; and a fluid having a lower optical absorption at a wavelength of the laser source than an optical absorption of fluids in the wellbore, the fluid configured to surround the laser head, contact the packer, and permit the laser beam to propagate to ablate the solid materials.

In an aspect combinable with the example implementation, the laser head includes a rotatable joint configured to adjust an angle of the laser head relative to the side of the housing.

In another aspect combinable with any of the previous aspects, the laser head includes one or more purge nozzles adjacent to a beam outlet of the laser head configured to direct a flow of the fluid to remove debris between the laser head and the solid materials.

In another aspect combinable with any of the previous aspects, the one or more purge nozzles are fluidly coupled to a supply of the fluid, wherein the fluid is configured to flow from the supply of the fluid through the one or more purge nozzles to surround the laser head.

In another aspect combinable with any of the previous aspects, the one or more optical elements include a focusing lens disposed between the laser source and a cover lens, the cover lens disposed between the focusing lens and a beam outlet of the laser head.

In another aspect combinable with any of the previous aspects, the laser head is optically coupled to the laser source through an optical fiber.

In another aspect combinable with any of the previous aspects, the housing includes one or more exhaust ports adjacent to the second end of the housing configured to remove at least a portion of the fluid from surrounding the laser head.

Another aspect combinable with any of the previous aspects includes a fluid level sensor mounted to the housing adjacent to the second end configured to measure a level of the fluids in the wellbore.

Another aspect combinable with any of the previous aspects includes a second packer adjacent to the second end of the housing, the second packer configured to form a lower extent of the fluid surrounding the laser head.

In another aspect combinable with any of the previous aspects, the packer includes an inflatable packing material or a mechanical packer.

Another aspect combinable with any of the previous aspects includes a temperature sensor connected to the laser head near a beam outlet of the laser head configured to measure a temperature of the laser head.

In another aspect combinable with any of the previous aspects, the fluid includes a gaseous mixture including nitrogen as a main component.

In another example implementation, a method for ablating solid materials in a wellbore includes extending a first packer adjacent to a first end of a laser tool to form a seal between the laser tool and walls of the wellbore; forming a volume of a first fluid surrounding a laser head of the laser tool, the first fluid having an optical absorption at a wavelength of the laser tool that is lower than an optical absorption of fluids in the wellbore at the wavelength of the laser tool; ablating solid materials in the wellbore by operating the laser tool, where operating the laser tool includes the laser tool transmitting a laser beam through the volume of the first fluid to the walls of the wellbore.

In an aspect combinable with the example implementation, forming the volume of the first fluid includes injecting the first fluid from a supply of the first fluid into the wellbore through a fluid outlet of the laser tool.

Another aspect combinable with any of the previous aspects includes operating an exhaust valve coupled to an exhaust port of the laser tool to remove a portion of the first fluid from the volume of the first fluid.

In another aspect combinable with any of the previous aspects, extending the first packer includes inflating inflatable packing material from a source of pressurized fluid or actuating a mechanical packer.

Another aspect combinable with any of the previous aspects includes rotating the laser head relative to the laser tool to target a location to ablate.

Another aspect combinable with any of the previous aspects includes removing debris intervening between the laser head and the walls of the wellbore by flowing the first fluid through purging nozzles of the laser head.

Another aspect combinable with any of the previous aspects includes measuring a temperature of the laser head using a temperature sensor coupled to the laser head.

Another aspect combinable with any of the previous aspects includes measuring a level of the fluids in the wellbore using a fluid level sensor.

Another aspect combinable with any of the previous aspects includes in response to measuring the level of the fluid in the wellbore, operating exhaust valves of the laser tool to control a size of the volume of the first fluid.

Another aspect combinable with any of the previous aspects includes extending a second packer adjacent to a second end of the laser tool opposite the first end, wherein the volume of the first fluid includes the volume between the first packer and the second packer.

What is claimed is:

1. A laser tool for ablating solid materials in a wellbore, the laser tool comprising:
    a housing having a first end and a second end opposite the first end;
    a laser head attached to a side of the housing between the first end and the second end, the laser head comprising a rotatable joint configured to adjust an angle of the laser head relative to the side of the housing and one or more optical elements configured to focus a laser beam to ablate the solid materials, the laser head optically coupled to a laser source;
    a packer adjacent to the first end of the housing, the packer configured to form a seal between the housing and interior surfaces of the wellbore; and
    a fluid having a lower optical absorption at a wavelength of the laser source than an optical absorption of fluids in the wellbore, the fluid configured to surround the laser head, contact the packer, and permit the laser beam to propagate to ablate the solid materials.

2. The laser tool of claim 1, wherein the laser head comprises one or more purge nozzles adjacent to a beam outlet of the laser head configured to direct a flow of the fluid to remove debris between the laser head and the solid materials.

3. The laser tool of claim 2, wherein the one or more purge nozzles are fluidly coupled to a supply of the fluid, wherein the fluid is configured to flow from the supply of the fluid through the one or more purge nozzles to surround the laser head.

4. The laser tool of claim 1, wherein the one or more optical elements comprise a focusing lens disposed between the laser source and a cover lens, the cover lens disposed between the focusing lens and a beam outlet of the laser head.

5. The laser tool of claim 1, wherein the laser head is optically coupled to the laser source through an optical fiber.

6. The laser tool of claim 1, wherein the housing comprises one or more exhaust ports adjacent to the second end of the housing configured to remove at least a portion of the fluid from surrounding the laser head.

7. The laser tool of claim 1, further comprising a fluid level sensor mounted to the housing adjacent to the second end configured to measure a level of the fluids in the wellbore.

8. The laser tool of claim 1, further comprising a second packer adjacent to the second end of the housing, the second packer configured to form a lower extent of the fluid surrounding the laser head.

9. The laser tool of claim 1, wherein the packer comprises an inflatable packing material or a mechanical packer.

10. The laser tool of claim 1, further comprising a temperature sensor connected to the laser head near a beam outlet of the laser head configured to measure a temperature of the laser head.

11. The laser tool of claim 1, wherein the fluid comprises a gaseous mixture including nitrogen as a main component.

12. A method for ablating solid materials in a wellbore, the method comprising:
    extending a first packer adjacent to a first end of a laser tool to form a seal between the laser tool and walls of the wellbore;
    forming a volume of a first fluid surrounding a laser head of the laser tool, the first fluid having an optical absorption at a wavelength of the laser tool that is lower than an optical absorption of fluids in the wellbore at the wavelength of the laser tool;
    rotating the laser head relative to a side of the laser tool to target a location to ablate;
    ablating solid materials in the wellbore by operating the laser tool, where operating the laser tool comprises the laser tool focusing a laser beam through the laser head attached to the side of the laser tool, the laser head comprising one or more optical lenses to focus the laser beam, and transmitting the laser beam through the volume of the first fluid to the walls of the wellbore.

13. The method of claim 12, wherein forming the volume of the first fluid comprises injecting the first fluid from a supply of the first fluid into the wellbore through a fluid outlet of the laser tool.

14. The method of claim 12, further comprising:
operating an exhaust valve coupled to an exhaust port of the laser tool to remove a portion of the first fluid from the volume of the first fluid.

15. The method of claim 12, wherein extending the first packer comprises inflating inflatable packing material from a source of pressurized fluid or actuating a mechanical packer.

16. The method of claim 12, further comprising:
removing debris intervening between the laser head and the walls of the wellbore by flowing the first fluid through purging nozzles of the laser head.

17. The method of claim 12, further comprising:
measuring a temperature of the laser head using a temperature sensor coupled to the laser head.

18. The method of claim 12, further comprising:
measuring a level of the fluids in the wellbore using a fluid level sensor.

19. The method of claim 18, further comprising:
in response to measuring the level of the fluids in the wellbore, operating exhaust valves of the laser tool to control a size of the volume of the first fluid.

20. The method of claim 19, further comprising:
extending a second packer adjacent to a second end of the laser tool opposite the first end, wherein the volume of the first fluid comprises the volume between the first packer and the second packer.

* * * * *